March 13, 1928.
W. R. SMITH ET AL
1,662,543
WHEEL HUB ASSEMBLING DEVICE
Filed March 22, 1926 2 Sheets-Sheet 1
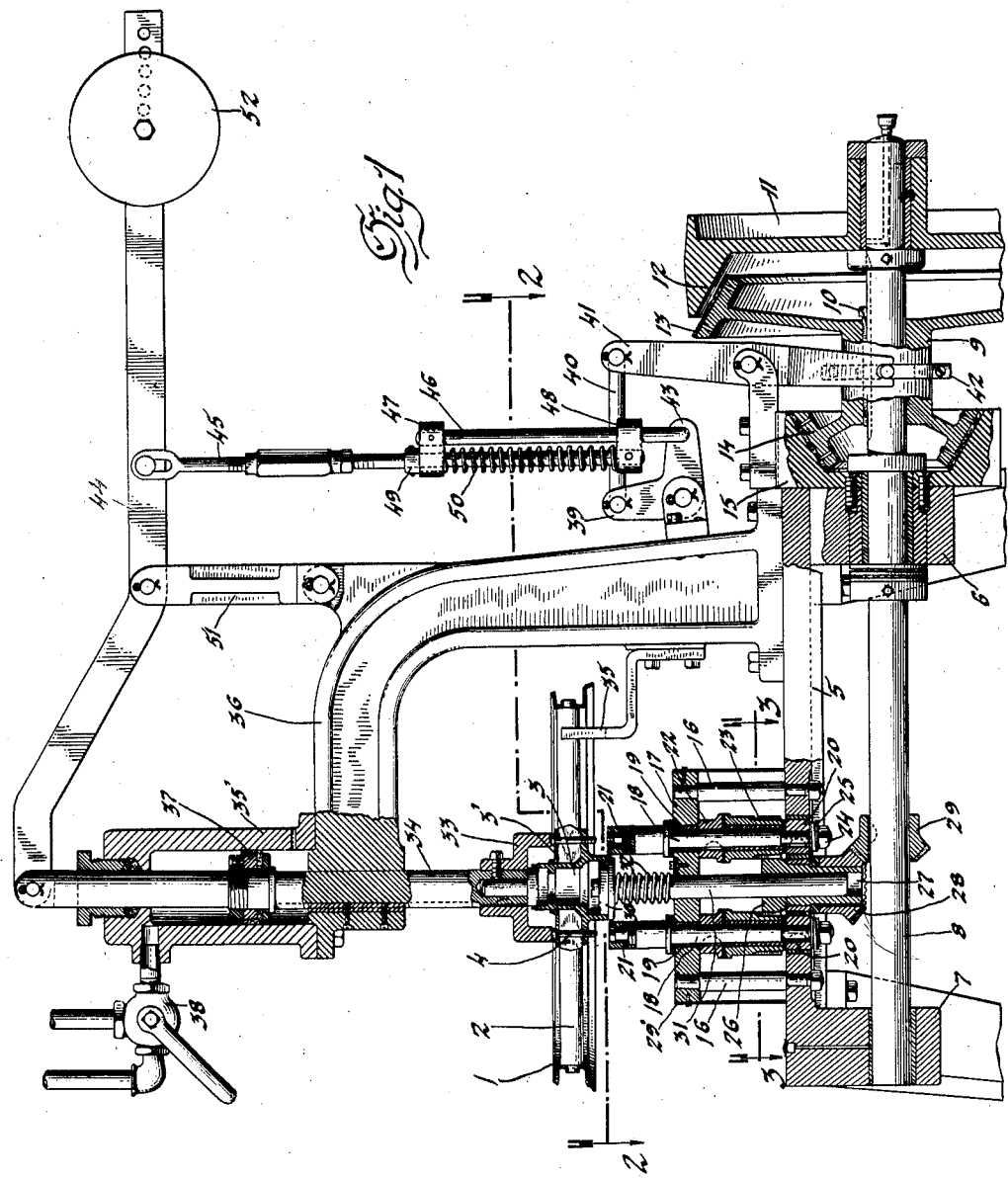
Inventors
Weston R. Smith &
Richard F. Wieneke
By Blackmore, Spencer & Flint
Attorneys

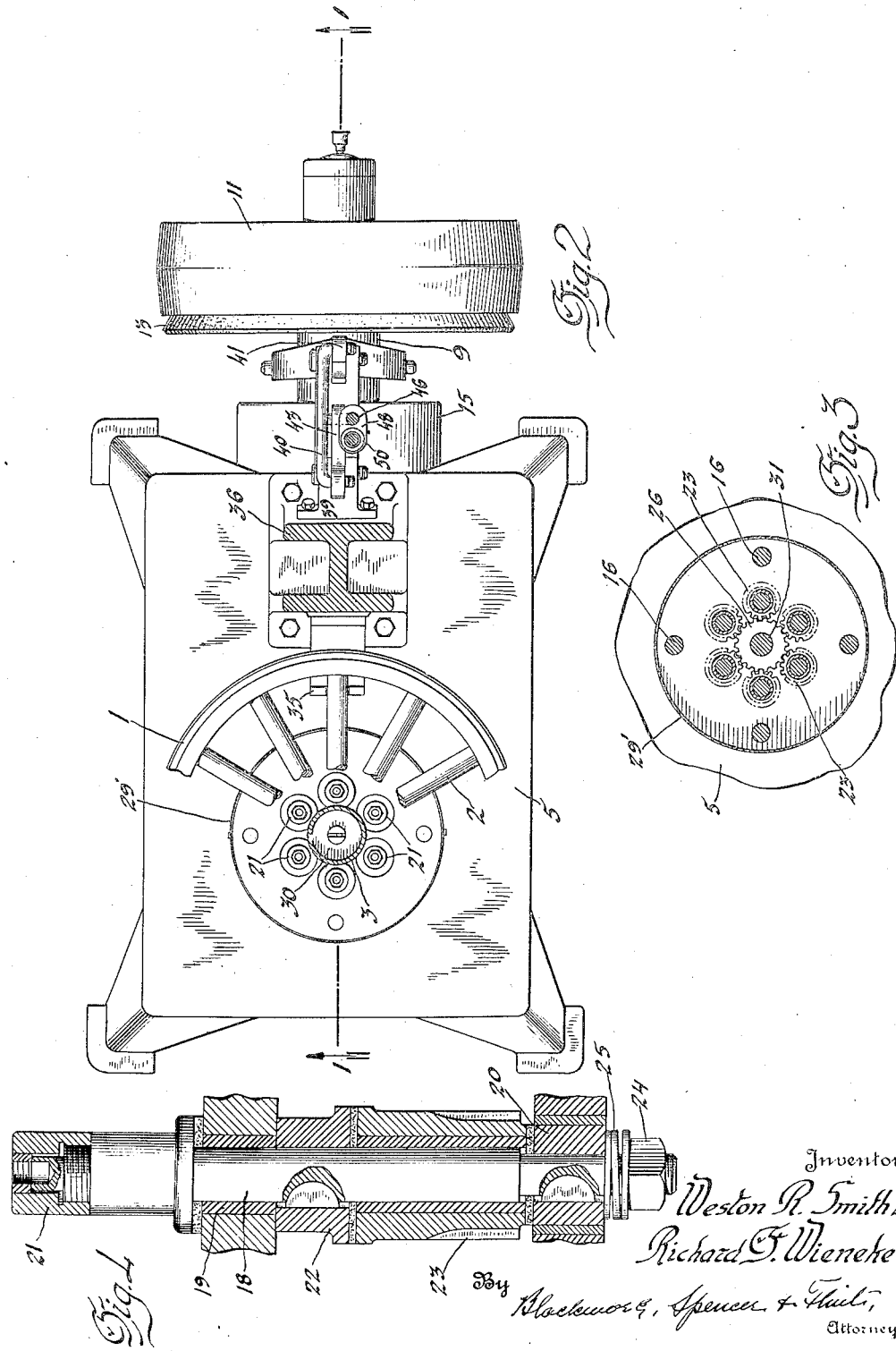

Patented Mar. 13, 1928.

1,662,543

UNITED STATES PATENT OFFICE.

WESTON R. SMITH AND RICHARD FRED WIENEKE, OF JACKSON, MICHIGAN, ASSIGNORS TO GENERAL MOTORS CORPORATION, OF DETROIT, MICHIGAN, A CORPORATION OF DELAWARE.

WHEEL-HUB-ASSEMBLING DEVICE.

Application filed March 22, 1926. Serial No. 96,545.

Our invention relates to machines used in the manufacture of motor vehicle and the like wheels of the type or class having spokes the inner ends of which are fastened between hub members arranged upon opposite sides of said ends, and wherein the hub parts and the inner ends of the spokes are held together by a plurality of bolts arranged in a circle and extending through the hub parts and the spokes; and the object of our invention is to provide a machine by the use of which the nuts upon the bolts of such wheels may be screwed upon said bolts simultaneously, and by a single operation of the machine, thus reducing to a very great degree the time required for securing the hub parts to the spokes with a corresponding reduction in manufacturing costs of the wheel.

With the above and other objects in view our invention consists in the improved wheel hub assembling device illustrated in the accompanying drawings, described in the following specification, and particularly claimed at the end thereof; and in such variations and modifications of the particular machine disclosed as come within the scope of the concluding claims when construed in view of the art relating to machines of the general class to which our invention relates.

In the drawings accompanying and forming a part of this specification and wherein the preferred embodiment of our invention is illustrated:

Figure 1 is a view showing our improved hub assembling machine partly in side elevation, but mostly upon a vertical plane the position of which is indicated by the line 1—1, Figure 2; the lower ends of the legs and the bottom part of the main driving wheel being cut off to shorten the view.

Figure 2 is a view taken upon horizontal planes indicated by the broken line 2—2, Figure 1, looking down.

Figure 3 is a fragmentary sectional view showing the driving means for the spindles of our device, the same being taken upon a plane indicated by the line 3—3, Figure 1.

Figure 4 is a view upon a larger scale than the other figures showing one of the spindles of our machine in section.

Referring now to the drawings, the reference numeral 5 designates the main frame of our machine whereby the parts thereof are supported and held in proper position relative to one another, the same being shown as comprising a horizontal top part or table supported by suitable legs. The frame is provided with bearings 6, 7 for supporting the main drive shaft 8 of the machine; and this shaft is driven from a clutch member 9 which is slidable upon the same along a key 10, so that rotary motion of the clutch member will be transmitted to the shaft. The numeral 11 designates the main driving member which receives power from a suitable driving motor or line shaft, the same being commonly in the form of a belt pulley or fly wheel which is loose upon the drive shaft 8, that is freely rotatable thereupon; and this driving member has a conical friction surface 12 with which a correspondingly shaped part 13 of the clutch member 9 may be made to engage, to thereby secure the driving of the shaft 8 by the wheel 11 through the friction faces 12, 13 and the clutch 9, as will be understood.

Although the friction surfaces 12, 13 are shown as conical they may be of other form; and as a matter of fact any suitable clutch capable of convenient operation to secure the driving of the machine from the wheel 11 or other driving member, and the interruption of such action, may be employed in lieu of the particular clutch illustrated. The slidable clutch member 9 is commonly provided with a second friction member 14 which engages a non-rotatable member 15 carried by the frame to thereby form a brake for quickly arresting rotary movement of the shaft 8 when the driving thereof is interrupted by movement of the clutch member to the left and out of driving engagement with the driving member 11, as will be appreciated.

Located above the top surface of the frame 5 and held in spaced relation thereto by columns 16 is a plate 17; and the numerals 18 designate a plurality of vertically arranged spindles rotatably supported in bearings in the said plate and in the base 5. The upper bearings 19 are plain bushed bearings, while the lower bearings are in the form of cylindrical bearing members 20 carried by and which are movable slightly longitudinally of the spindles for a purpose hereinafter to appear, and which bearing members in turn rotate in suitable bushings in the base. The spindles 18 are arranged equal distances apart in a circle about a common central axis, and they correspond in number with the number of bolts whereby the hub parts of the wheel to be operated upon are fastened together, with the inner ends of the usual spokes clamped between such hub parts; six spindles to screw up the nuts upon six hub bolts of a wheel being shown in the embodiment of our invention illustrated and described herein.

Fast upon the upper ends of the spindles 18 are a like number of nut holding and driving chucks 21 having recesses in their upper extremities shaped to receive the nuts to be screwed on to the hub bolts of the wheel which is operated upon, as best shown in Figure 2; and the numerals 22 designate friction driving collars fixedly fastened one upon each spindle, and through which the spindles are driven. Carried by the spindles but loose thereupon so that they may rotate without driving them are driving pinions 23 having friction faces at their upper ends to engage the collars 22 and drive the spindles through friction or slip couplings thus provided, and the lower ends of which pinions abut against the upper ends of the bearing members 20. These bearing members may be forced upward by nuts 24 upon the lower ends of the spindles acting upon the lower ends of said members through springs 25, to thereby vary the friction between the upper ends of the pinions 23 and the driving collars 22 and, as follows, the resistance at the chucks which will result in slipping between the pinions and the friction members. In the operation of the machine the friction drive for any particular spindle will slip when the nut which is being screwed on its bolt engages the face of the hub part and reaches its proper screwed up position, after which further screwing up of the nut is prevented. Each spindle has its own slip drive connection so that slipping may occur as regards each spindle when the nut which it is operating upon reaches its final position. Obviously such slipping will continue so long as the driving member 11 is kept in driving engagement with the drive shaft 8 through the clutch member 9, although obviously the driving will be interrupted as soon as practicable after all the nuts have been properly secured on to the hub bolts 4 of the wheel.

The several pinions 23 and their spindles are driven from a single driving gear 26 in mesh with all of them, and which gear is rotatable in a bearing in the base 5. The proper support and bearing for the gear is provided by a tubular sleeve 27 depending therefrom, and which serves as a journal for the gear; and to the lower end of which a miter gear 28 is fastened, which in turn is driven by a similar gear 29 fast upon the drive shaft 8 and in mesh with said gear 28.

The spindles and the driving mechanism therefor are enclosed and protected by a suitable casing 29' extending from the top plate 17 downward to the base 5 as shown.

The wheel operated upon is shown as comprising a rim 1 which may be of any form, spokes 2, hub members 3, 3' which vary in form in different wheels, and hub bolts 4 varying also in number employed in different wheels; and which bolts extend through the hub parts or members and the inner ends of the spokes to fasten the parts together. In actual practice the inner hub member, that is the one which is inside and the nearer the center line of the vehicle when the wheel is in use, may become or be replaced by the usual brake drums such as are commonly provided upon the rear wheels of a motor vehicle.

When the clutch member 9 is in engagement with the driving member 11 all of the nut chucks 21 will be driven and, assuming that nuts are present in the nut holding recesses thereof, if and when a wheel is brought into proper operative relation with the chucks the nuts will be screwed on to the threaded lower ends of the bolts 4, all at one and the same time. Various means may be provided for thus positioning the wheel relative to the machine parts so that nuts will be screwed on to the hub bolts thereof but in the preferred form of our invention illustrated that end is accomplished by providing a vertically movable head 30 within the space surrounded and enclosed by the nut chucks 21, and which head is adapted to receive the lower end of the wheel hub and to support the wheel; said head having a depending stem 31 extending into the sleeve 27 of the gear 26 to thereby guide and steady the wheel supporting head; which head is urged upward and returned to its uppermost position after it has been moved downward with a wheel supported thereby by a spring 32 acting between the under side of the head and the upper surface of the frame 5.

The wheel operated upon is shown as moved downward to bring the threaded lower ends of its bolts 4 into engagement with nuts carried by the nut chucks 21 by a reciprocating member 33 upon the lower end of a rod 34, and which member engages the upper hub member 3' and pushes the wheel downward against the holding up action of the spring 32. The wheel is positioned angularly so that the bolts are in line with the nuts in any way as by means of an upstanding stop 35 bifurcated to straddle a spoke of the wheel as the wheel is placed in position upon the supporting head 30.

The power device for moving the member 33 downward is shown as comprising a cylinder 35' supported by standard 36 which extends upward from the base 5, and within which a piston 37 carried by the rod 34 operates. Air under pressure is admitted into and exhausted from the upper end of the cylinder 35′, by a valve 38 of appropriate design.

The clutch member 9 is operated by a bell crank lever supported from the base 5 and the vertical arm 39 of which is operatively connected with the clutch through a link 40, lever 41 pivotally supported from the frame 5, and shifting ring 42 of usual form; while the horizontal arm 43 of said bell crank lever is connected with a lever 44 through a yieldable link comprising rods 45, 46 having guides 47, 48 fastened to the ends of each, and having passages through which the other rod may slide; the guides being forced apart and one of them against a stop collar 49 by a spring 50 surrounding one of the rods.

The lever 44 is pivotally supported by a link 51 carried by the standard 36 and the left hand end of which is pivotally connected with the upper end of the rod 34, while the right hand end of said lever is provided with a weight 52 or equivalent device for insuring the return of the wheel depressing member 33 to its uppermost position after it has been moved downward, and the interior of the cylinder has been placed in communication with the atmosphere to permit the escape of air therefrom by the valve 38. It therefore follows that movement of the wheel downward and movement of the clutch to secure the driving of the shaft 8 occur simultaneously, and that further movement of the wheel after the clutch parts have engaged and the shaft 8 is started is permitted by the spring 50; this being to prevent the nuts in the recesses of the nut chucks from leaving said recesses as they are screwed on to the hub bolts of the wheel.

In using our invention the rim 1, spokes 2, hub members 3 and 3′, and hub bolts 4 are first assembled, thus providing a unitary wheel structure which is complete except for the screwing of the nuts upon the bolts, and except for the final painting of the wheel. We have made various inventions in and connected with the assembling of the parts which make up the wheel which, however, form no part of this present invention, and so far as this present invention is concerned the wheel may be assembled manually, or by the use of any suitable machines or processes.

When our machine is to be used there will be a nut in each of the nut holding chucks 21. We have devised means for supplying nuts to the chucks automatically; but for the purpose of this present invention it will be assumed that the nuts are placed in the chucks by hand, as at first the wheel, as a matter of course, is not in the machine, and the chucks are in a position such that nuts may be readily placed in them by the operator of the machine.

A wheel assembled as aforesaid is now taken by the operator and placed upon the movable hub support or head 30, with a spoke in engagement with the properly adjusted stop 35, and with the threaded ends of the bolts 4 downward. The valve 38 is now operated to admit air into the upper end of the cylinder 35′; whereupon the wheel is forced downward against the action of the spring 32 and as a simultaneous occurence the conical part 13 of the clutch member 9 is forced into contact with the similar part 12 of the flywheel, thus initiating the rotation of the shaft 8 and of the several spindles 18 which have the nut chucks at their upper ends.

During downward movement of the wheel the extremities of the bolts 4 will engage the nuts in the nut chucks, and thereafter the nuts in the chucks will be screwed on to the several bolts. When each separate nut is screwed home its chuck will cease to rotate because of the slip connection in each spindle 18, as heretofore explained, and as soon as possible after the last nut has been screwed home the valve 38 will be operated to permit air to flow out from the cylinder 35′; whereupon the spring 32 will lift the wheel, the clutch will be opened and the driving of the shaft 8 and spindle 18 will be interrupted, and the wheel may be removed from the machine.

Having thus described and explained our invention we claim and desire to secure by Letters Patent:

1. In a device of the class described, a vertically movable head adapted to receive a wheel hub and to support a wheel; a spring acting upon said head and arranged to hold the same in its normal uppermost position, and to return it thereinto after said head has been moved downward; a plurality of vertically arranged rotatable spindles the upper ends of which are disposed about said head, and each of which has a nut holding and driving chuck at its upper extremity; means for driving said several spindles in unison; yieldable friction driving devices associated one with each of said spindles and through which said spindles and chucks are normally driven; and means engaging a wheel supported by said head to move the wheel and head downward against the resistance of said spring and cause the threaded ends of bolts carried by the wheel to engage nuts carried by the chucks aforesaid.

2. In a device of the class described, a vertically movable head adapted to receive a wheel hub and to support a wheel; a plurality of vertically arranged rotatable spindles the upper ends of which are disposed about said head, and each of which has a nut holding and driving chuck at its upper extremity; a rotatable drive shaft operatively connected with said spindles to drive them in unison; a driving member normally disconnected from said drive shaft; a clutch whereby and through which said driving member may be connected with said drive shaft to drive the same; and means engaging a wheel supported by said head to move the wheel and head downward and cause the threaded ends of bolts carried by the wheel to engage nuts carried by the chucks aforesaid, and to simultaneously operate said clutch to thereby operatively connect said driving member with said drive shaft.

3. In a device of the class described, a vertically movable head adapted to receive a wheel hub and to support a wheel; a plurality of vertically arranged rotatable spindles the upper ends of which are disposed about said head, and each of which has a nut holding and driving chuck at its upper extremity; a rotatable drive shaft arranged transverse to said spindles; gearing whereby and through which said spindles are driven from said shaft; a driving member rotatable upon said drive shaft; a clutch whereby said driving member may be operatively connected with said drive shaft to drive the same; a reciprocating member adapted to engage a wheel supported by said head to thereby move the wheel and head downward and cause the threaded ends of bolts carried by the wheel to engage nuts carried by said chucks; means for operating said clutch to thereby operatively connect said driving member with said drive shaft; and a resilient link through which movement of said reciprocating member is communicated to the clutch operating means aforesaid.

4. In a device of the class described, a vertically movable head adapted to receive a wheel hub and to support a wheel; a plurality of vertically arranged rotatable spindles the upper ends of which are disposed about said head, and each of which has a nut holding and driving chuck at its upper extremity; a rotatable drive shaft arranged transverse to said spindles; gearing whereby said spindles are driven from said shaft; a driving member rotatable upon said drive shaft; a clutch whereby said driving member may be operatively connected with said drive shaft to drive the same; a reciprocating member adapted to engage a wheel supported by said head to thereby move the wheel and head downward and cause the threaded ends of bolts carried by the wheel to engage nuts carried by said chucks; means for operating said clutch to thereby operatively connect said driving member with said drive shaft; a cylinder and piston for imparting downward movement to said reciprocating member; a lever pivotally supported intermediate its ends and one end of which is connected with said reciprocating member so as to be moved thereby, and the other end of which lever has means tending to move said reciprocating member upward; and a resilient link the upper end of which is connected with the second mentioned end of said lever, and the lower end of which is operatively connected with the clutch operating means aforesaid.

5. In a device of the class described, a suitable fixed support or base; a plate located above and supported in a fixed position by and spaced from said base; a plurality of vertically arranged rotatable spindles disposed about a central axis, and the upper and lower ends of which are supported in bearings provided in said base and plate; nut holding and driving chucks carried one by each of said spindles, and which chucks are located above said plate; driving pinions one loose upon each of the spindles aforesaid; friction driving devices through which each spindle is driven from the pinion thereupon; a single driving gear in mesh with all of said pinions; and means for driving said driving gear.

6. In a device of the class described, a suitable support or base; a plate located above and supported by and spaced from said base; a plurality of vertically arranged rotatable spindles disposed about a central axis, and the upper ends of which are supported in bearings in said plate; bearing members one slidable upon the lower end of each spindle, and which members are arranged within bearings provided in said base; nut holding and driving chucks one at the upper end of each of said spindles; friction driving collars secured one to each of said spindles; driving pinions one loose upon each of the spindles aforesaid, and which pinions are arranged between said bearing members and said collars; nuts upon the lower ends of said spindles for forcing said bearing members against said pinions and said pinions against said driving collars to regulate the friction between said pinions and collars; a single driving gear supported in a bearing in said base and which gear is in mesh with all of said pinions; and means for driving said driving gear.

7. In a device of the class described, a suitable fixed support or base; a plate located above and supported in a fixed position by and spaced from said base; a plurality of vertically arranged rotatable spindles disposed about a central axis, and the upper and lower ends of which are supported in bearings provided in said base and plate; nut holding and driving chucks carried one by each of said spindles, and which chucks are located above said plate; driving pinions carried by and operatively connected one with each of the spindles aforesaid, and which pinions are located between said base and said plate; a single driving gear rotatable in a bearing in said base, and which gear is in mesh with all of said pinions; and means arranged below said base for driving said driving gear.

8. In a device of the class described, a suitable support or base; a plate located above and supported by and spaced from said base; a plurality of vertically arranged rotatable spindles disposed about a central axis, and the upper and lower ends of which are supported in bearings provided in said base and plate, nut holding and driving chucks carried one by each of said spindles, and which chucks are located above said plate; driving pinions carried by and operatively connected one with each of the spindles aforesaid, and which pinions are located between said base and said plate; a single driving gear rotatable in a bearing in said base, and which gear is in mesh with all of the pinions aforesaid and has a passage extending through it; a vertically movable wheel supporting head arranged within the space enclosed by said chucks, and having a depending stem guided in a bearing in said plate and extending into the passage aforesaid in said driving gear; and means arranged below said base for driving said gear.

9. In a device of the class described, a plurality of spindles rotatable in suitable bearings provided therefor, and means for driving said spindles in unison, said spindles being arranged about a common axis and having each a nut holding and driving chuck at one of its ends; yieldable friction driving devices associated one with each of said spindles and through which said spindles and chucks are normally driven; a clutch whereby and through which the driving means aforesaid for the spindles is driven; and means for simultaneously operating said clutch to secure the driving of said spindles and for moving a wheel having bolts arranged similarly to the chucks aforesaid into a position such that the threaded ends of said bolts will be engaged by nuts carried by said chucks.

10. In a device of the class described, a plurality of spindles rotatable in suitable bearings provided therefor, said spindles being arranged about a common axis and having each a nut holding and driving chuck at one of its ends; yieldable friction driving devices associated one with each of said spindles and through which said spindles and chucks are driven; a plurality of pinions adapted to drive said spindles through said friction driving devices; a driving gear in mesh with all of said pinions to drive them and said spindles in unison; a drive shaft operatively connected with said driving gear; a driving member rotatable upon said drive shaft; a clutch whereby said driving member may be operatively connected with said drive shaft to drive the same; and means for simultaneously operating said clutch to secure the driving of said drive shaft and for moving a wheel having bolts arranged similarly to the chucks aforesaid into a position such that the threaded ends of said bolts will be engaged by nuts carried by said chucks.

In testimony whereof we affix our signatures.

WESTON R. SMITH.
RICHARD FRED WIENEKE.